2 Sheets—Sheet 1.

C. D. GOUBET.
Universal Joint.

No. 213,505.    Patented Mar. 25, 1879.

Witnesses
John Davis
Henry Waterman

Inventor.
Claude Desire Goubet
by Charles F. Blake
his Atty

N. PETERS, PHOTO-LITHOGRAPHER, WASHINGTON, D.C.

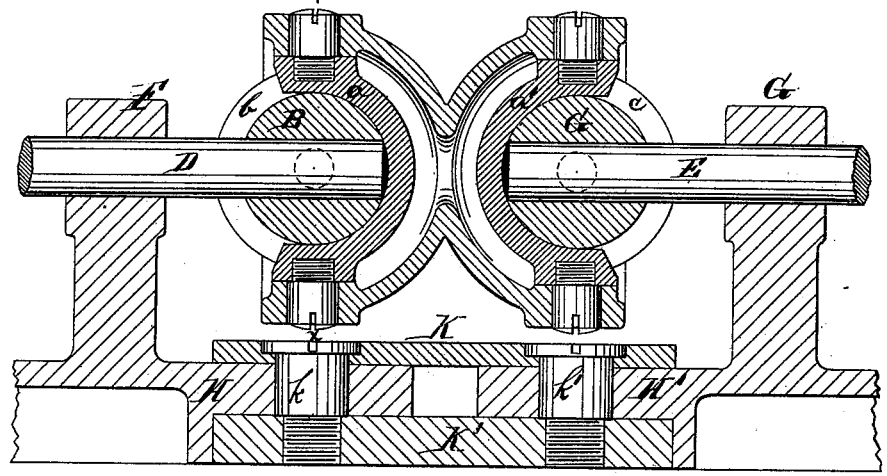
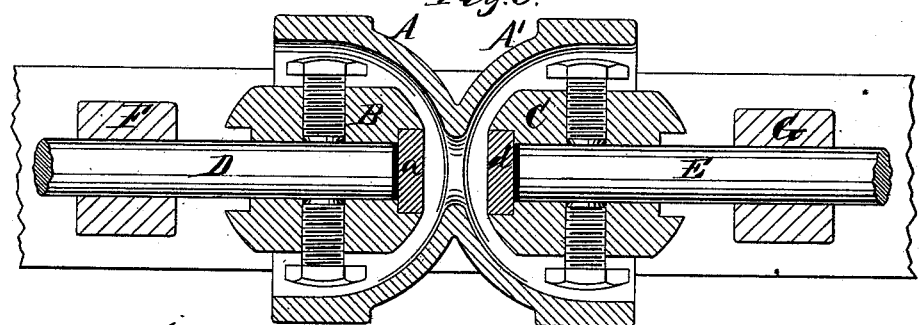
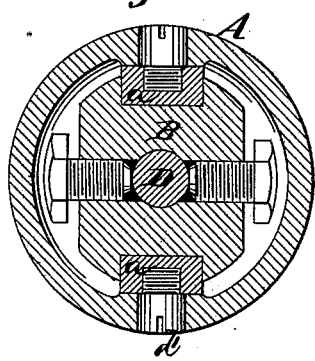
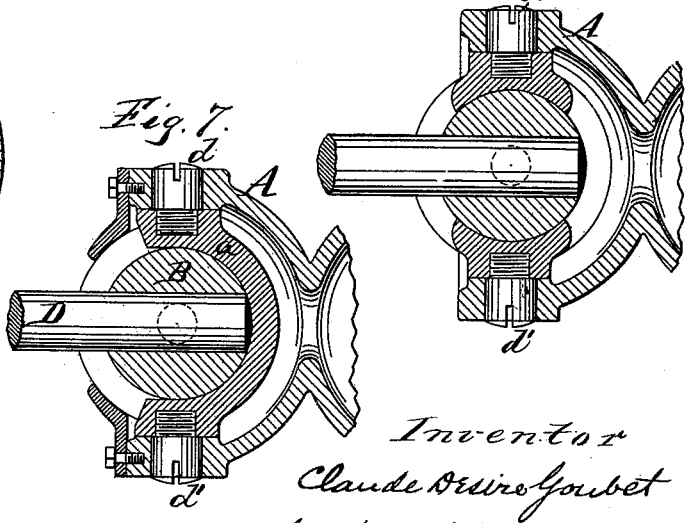

UNITED STATES PATENT OFFICE.

CLAUDE D. GOUBET, OF PARIS, FRANCE.

IMPROVEMENT IN UNIVERSAL JOINTS.

Specification forming part of Letters Patent No. 213,505, dated March 25, 1879; application filed January 17, 1879.

*To all whom it may concern:*

Be it known that I, CLAUDE DESIRE GOUBET, of the city of Paris and Republic of France, have made a new and useful invention of a System of Universal Joints for Shafts, which consists of an arrangement by which shafting may be connected to other shafting at an angle, so that one shaft will cause the other to revolve.

It has long been customary to transmit motion from one shaft to another, at an angle thereto, by means of bevel or miter gear wheels, which, however, is attended with great loss of power on account of the friction of the cogs and irregularity of the transmission of the motion.

An arrangement of a ring having within it two short cross-shafts resting in bearings on opposite sides of the ring, and at right angles to one another, one cross-shaft being rigidly attached at right angles thereto to one line of shafting, and the other cross-shaft being attached in the same manner to the other line, is sometimes used in transmitting motion.

The following is such a full, clear, and exact description of my invention as will enable others skilled in the art to which it most nearly appertains to make and use the same, when taken in connection with the accompanying drawings, in which—

Figure 1:
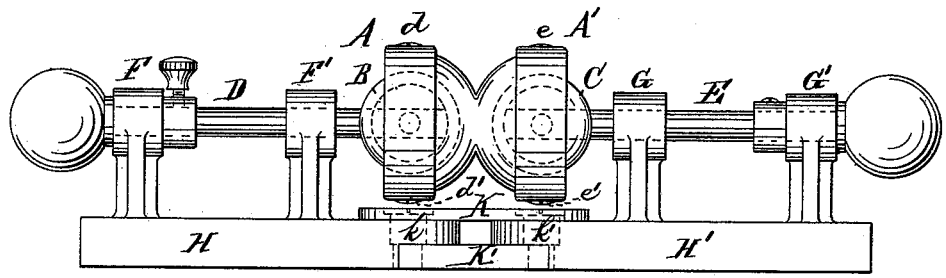
Figure 2:
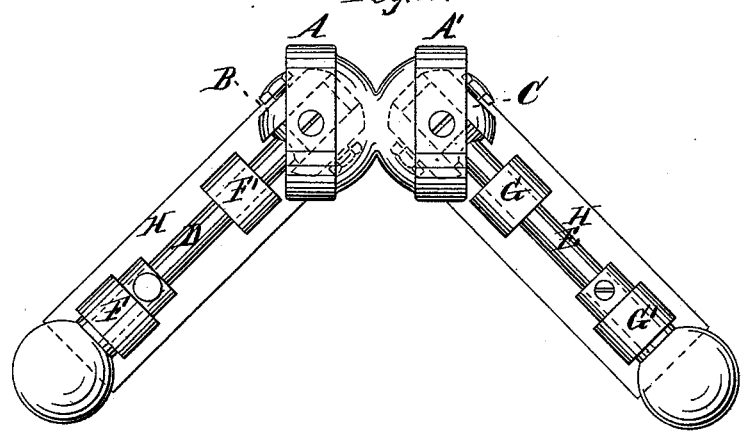
Figure 3:
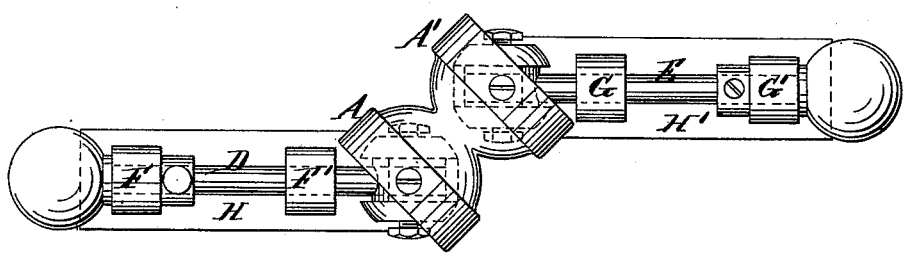

Figure 1 is a front view of my improved joint. Fig. 2 is a top view of the same, showing the shafts at right angles to one another. Fig. 3 is a top view of the same, showing the shafts in parallel planes. Fig. 4 is a longitudinal vertical section. Fig. 5 is a longitudinal horizontal section. Fig. 6 is a cross-section of Fig. 4 at the line $x\ x$. Fig. 7 is a modification of the socket. Fig. 8 is a modification of the slides.

Like letters indicate like parts in all the figures.

The double socket A A' is made of the proper length and diameter to accommodate the balls B C, which are rigidly attached to their respective shafts. On the end of each of the shafts D E, which are to be connected with one another, are rigidly attached balls B C, of a diameter somewhat smaller than the diameter of the inside of the tube or double socket. Around each ball is cut a groove, $b$ and $c$, parallel to the axis of the shaft to which it is rigidly attached, to receive the slides $a\ a'$.

Instead of the balls may be used plates, one smaller than, and introduced between, the other two, forming a groove for the pivoted semicircular bearing-piece to run in.

The double socket A A' may be made, as represented in the drawings, of two half-spheres, joined at their poles; or a tube of equal diameter throughout its entire length may be used. Within the tube or half-spheres are arranged semicircular slides or pivoted semicircular bearing-pieces $a\ a'$, the piece $a$ being pivoted at $d\ d'$, while $a'$ is pivoted at $e\ e'$.

Instead of the two semicircular slides or bearing-pieces, four shorter slides or rollers may be pivoted at the same points $d\ d'\ e\ e'$.

The shafts D E are held in bearings F F' G G', and have upon them collars to keep the balls B C in the tube or double socket. The bearings are formed on, or attached to, the plate-pieces H H', which are fastened to one another by the connecting-plates K K' and the screws $k\ k'$, the pivot-holes in the connecting-plate being the same distance apart as the pivot-holes $d\ d'$ from $e\ e'$ in the tube or double socket, so that the plate-pieces H H' are kept in the same relation to one another as the two balls B and C.

Instead of the bearings and collars, as above described, the shafts may be held together either by continuing the semicircular bearing-slides $a\ a'$, so that they are each more than a semicircle, and will hold on or grasp the bottom of the groove in the ball and prevent separation, or the ends of the tube or socket may be continued around over the balls, so as to prevent their coming out of the sockets, as shown in Fig. 7 of the drawings.

The mode of operation of my system of universal joints for shafts is as follows: The parts being in position as specified above, and as shown in Fig. 1, the revolution of one shaft, as D, turns the ball B, which carries with it the pivoted bearing-piece $a$, fitting in the groove $b$, which pivoted bearing-piece causes the tube or double socket A A' to revolve, being attached to it by the pivots $d\ d'$, and the connection of the shaft E with the tube or double socket, corresponding in form with that of D and its tube or double socket, causes the shaft E to revolve with the revolution of its tube or double socket. When the parts are connected and the shafts are made to form an angle with one another, as shown in Fig. 2, the communication of revolution from one shaft to the other is accomplished in the same manner as above described, with the additional movement of the pivoted bearing-pieces through the grooves $a\ a'$ and on their pivots, by which movements the shafts and double socket or tube are made to accommodate themselves to one another as their successive sides are brought on the inner side of the angle formed by the different parts. The pivoted bearing-pieces being free to turn on their pivots and to slide in the grooves, but not being free to revolve in the tube or double socket, the shaft E is turned by the turning of the shaft D.

The tube or double socket with two balls and slides will readily transmit power when the shafts form an angle of ninety degrees or less. When a greater angle has to be turned, one or more tubes or double sockets may be added, with a short shaft between the two, so that a portion of the angle may be turned at each tube or double socket. When a small angle only is made, a single socket or tube may be used, with a single pivoted bearing-piece, one shaft being rigidly fastened in the tube or double socket, with their axes continuous.

My system of universal joints for shafts may be used when the two connected shafts are in different parallel planes, by making the angle at one end of the tube or double socket in one direction, and the angle at the other end in the opposite direction.

An eccentric pulley or other device may be put on the tube or double socket to communicate motion, if desired.

What I claim as new, and desire to secure by Letters Patent of the United States, is—

1. The combination of a socket and grooved ball, pivoted substantially as specified and set forth.

2. The combination of a tube or double socket, two grooved balls, and two pivoted bearing-pieces, substantially as specified and set forth.

3. The combination of a socket, grooved ball, and pivoted bearing-piece with hinged shaft-bearings, as specified and set forth.

4. The combination of a tube or double socket, two grooved balls, and two pivoted bearing-pieces with hinged shaft-bearings, as specified and set forth.

In testimony whereof I have signed my name to this specification before two subscribing witnesses.

C. D. GOUBET.

Witnesses:
  ROBT. M. HOOPER,
  GEO. A. GLAENZOR.